Figure 1:
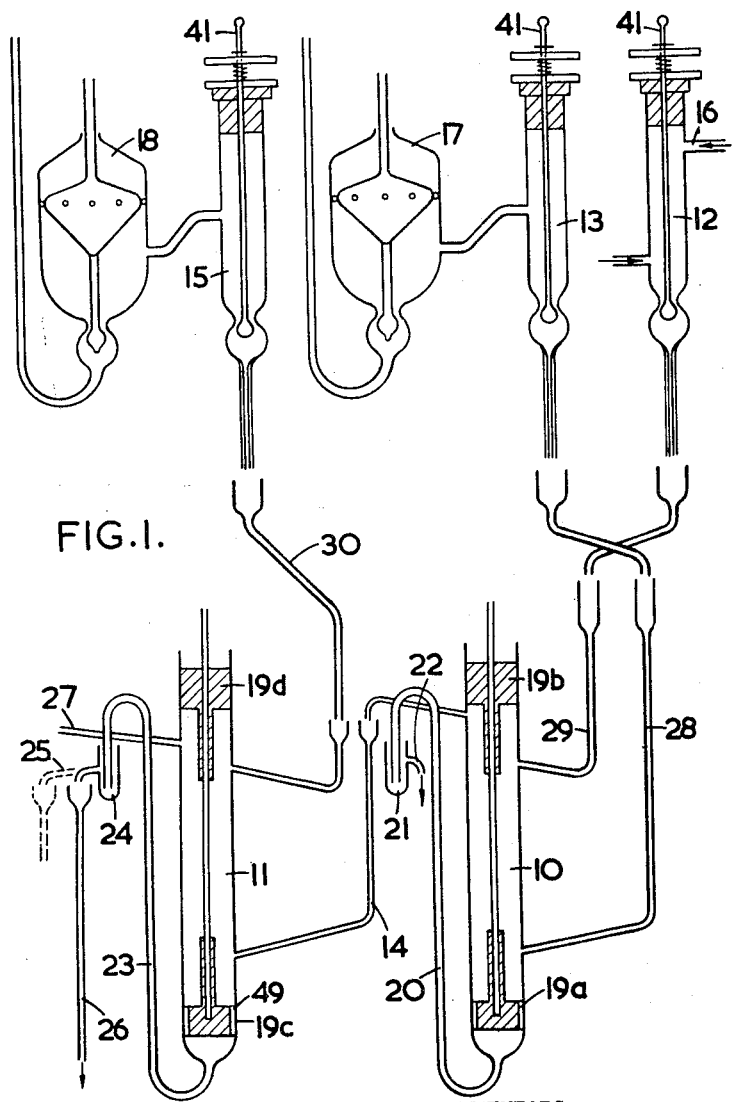

INVENTORS:
HAROLD MASON, JAMES ROLAND
SANDERSON and TONY MASON

By
Attorneys for Applicants

United States Patent Office 3,099,537
Patented July 30, 1963

1

3,099,537
PROCESS FOR THE TREATMENT OF AN ORGANIC SOLVENT CONTAINING URANIUM
Harold Mason, Preston, James Roland Sanderson, Lea, near Preston, and Tony Mason, Blackpool, England, assignors to the United Kingdom Atomic Energy Authority, London, England
Filed Oct. 28, 1958, Ser. No. 770,096
Claims priority, application Great Britain Oct. 31, 1957
7 Claims. (Cl. 23—230)

This invention relates to a process for the treatment of uranium solutions in order to evaluate colorimetrically the quantity of uranium present.

In the production of uranium and its compounds by processes involving liquid waste it is important that as little as possible of the uranium should run to waste, not only because of its intrinsic value, especially when concentrated in the $U^{235}$ isotope, but because it is a toxic substance which can constitute a health hazard if present in quantity. It is therefore desirable that the uranium content of all effluent from a production plant using uranium should be accurately measured at frequent intervals and that the results should be presented to the plant operator within a few minutes of the sample being taken so that plant operation can be corrected, if necessary, before loss of uranium reaches substantial proportions. It is also desirable, in order to make these corrections in the right place and for general control purposes, to check various intermediate process solutions individually for their uranium content. However for uranium to be accurately determined it must first be separated from most other metals and although separation can be effected by solvent extraction using organic solvents known methods of separation and determination are a combination of time-consuming steps and require manual operation by skilled labour if they are to be efficient. It is an object of the present invention to provide an efficient method of treating organic solvents to detect the presence of small quantities of uranium, which method can be made continuous and automatic, and is capable of giving results within a few minutes of the test being started.

According to the present invention a process for the treatment of an organic solvent containing uranium comprises the steps of washing the solvent with an aqueous solution of a colorimetric agent for uranium so as to bring substantially all the uranium into the aqueous solution, treating at least part of the colored aqueous solution with a decolorizing agent for the coloration due to uranium only and measuring the difference between color intensity before and after treatment with the decolorizing agent.

Other elements may be present in the organic solvent with the uranium and also color the aqueous solution but the difference in color intensity of the solution before and after treatment with the decolorizing agent is a measure of the uranium concentration of the solution. Hence the original uranium concentration can be calculated.

In order to test an aqueous solution for uranium any uranium in the aqueous solution is transferred to an organic solvent by a conventional solvent extraction step and the test of the invention is then carried out on the organic phase. If necessary a salting agent is added to the original aqueous solution to ensure that substantially all the uranium is transferred to the organic phase. The preferred organic solvent is tributyl phosphate diluted with odorless kerosene and the preferred salting agent nitric acid.

A preferred colorimetric agent is ammonium thioglycollate solution which converts any uranium in the organic solvent to uranium thioglycollate having an intense yellow color. This uranium thioglycollate may be destroyed by carbonate ions yielding a colorless double carbonate of uranium and ammonia. The carbonate ion may be added as carbon dioxide or ammonium carbonate but carbon dioxide is preferred as the decoloration step does not then lead to any volume change in the thioglycollate solution and comparative measurement of the color intensity is therefore easier.

If the organic solvent also contains thorium this must be removed or complexed before the solvent is washed with an alkaline aqueous solution. Otherwise thorium will precipitate as the hydroxide and uranium will be occluded with it. A suitable method of complexing thorium is to wash the organic solvent with a neutral solution of a complexing agent such as the sodium salt of ethylene diamine tetra acetic acid.

By way of example the invention will now be described with reference to the accompanying drawings which are diagrammatic views showing the application of the invention to the continuous automatic testing of aqueous solutions.

Figure 2:
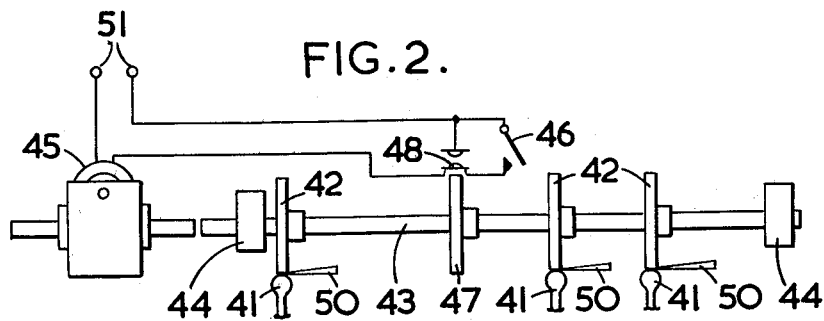
Figure 3:
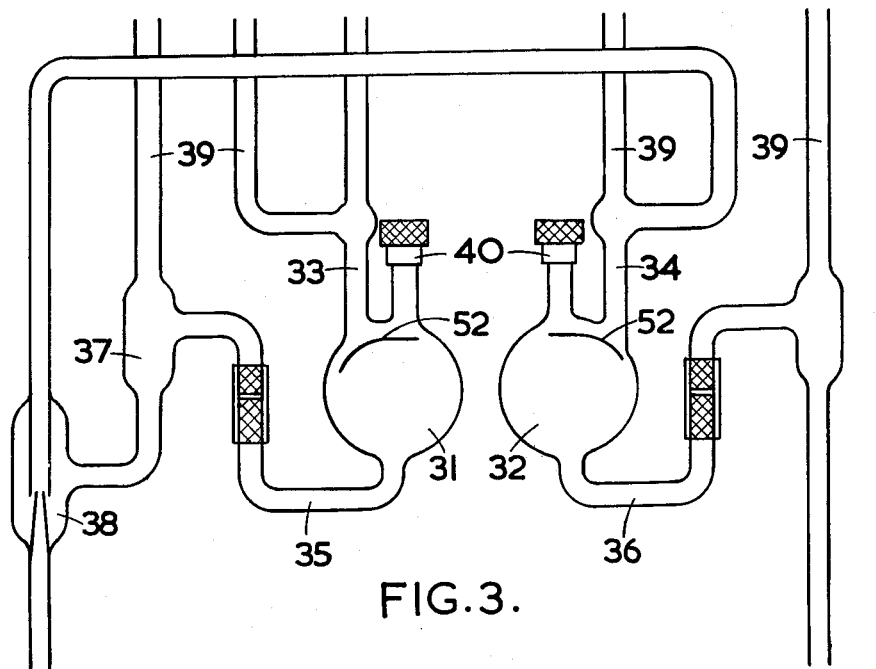

FIG. 1 shows the injection and extraction system;
FIG. 2 shows the mechanism for controlling the rate of liquid flow to the system of FIG. 1; and
FIG. 3 shows the absorptiometric cell unit.

The apparatus of FIG. 1 comprises essentially a forward extraction column 10 and a backward extraction column 11. The column 10 is fed with aqueous sample from the dispenser 12 and with organic solvent from the dispenser 13 (via the pipes 28, 29, respectively). The column 11 is fed with organic solvent phase from column 10 via the pipe 14 and with ammonium thioglycollate solution from the dispenser 15 via the pipe 30. The dispensers 12, 13, 15 are more fully described in copending U.S. application Serial No. 770,097. A constant head is maintained in the sample dispenser 12 by an overflow pipe 16 and in the dispensers 13 and 15 by float chambers 17 and 18, respectively. The columns are of the rotary type described in United States Patent No. 2,474,007 and are fitted with polythene bearings 19a, b, c, d, which provide annular unstirred settling spaces between the bearings and the column walls at the top and bottom of each column. The bottom bearings 19a, 19b have cut away parts 49 which allow the passage of liquid through them. The aqueous phase leaves the column 10 via a siphon arm 20 which dips into a small secondary vessel 21 constituting the controller for the "static" interface, that is, the position of the interface in the column 10 when the feed solutions are flowing but the rotor is stopped, and having an outlet 22 from which the aqueous phase drips to waste. From the column 11 the aqueous phase flows via a siphon arm 23 to a subsidiary settling vessel 24 which constitutes a static interface controller for the column 11 and has an outlet 25 to waste for any organic phase carried into the vessel 24 and an outlet 26 to an absorptiometer (FIG. 3) for the uranium containing aqueous phase. The solvent phase leaves the column 11 by a pipe 27 and can be recovered for re-use if desired.

On passing feed solutions into the column 10 with the rotor operating vortex formation takes place, each vortex consisting of a series of small globules of solvent which slowly rise through the continuous aqueous phase until they reach the annular setting space around the bearing 19b. As a consequence of flow of solvent through the column a mixture of solvent and aqueous phase is carried some distance up the annular space before final separation occurs and this point is shown as a well-defined interface line termed the "dynamic" interface. This position of this interface is determined by the flow-rates used, the rotor speed and the positions of the static interface. Preferably the dynamic interface is just above the aqueous inlet port and small adjustments can be made with the static interface controller to set it at the correct level. Normally the best procedure for column start-up is to run in the feed solution with the rotor switched off and to arrange that the static interface is about 2 inches below the bottom of the settling space, the rotor being switched on when the static interface is stable. In the siphon arm arm 20 there is only one liquid aqueous phase—and this is counterbalanced in the column 10 by two phases of different densities. If the interface controller is moved upwards the head of liquid which is supportable by the siphon arm 20 is increased; more organic phase will therefore run out of the outlet pipe 14 and this organic phase will be replaced in the column 10 by aqueous phase. Consequently the interface rises until equilibrium between the column and the siphon arm is again attained. The column 11 is adjusted similarly to the column 10 except that in the column 11 the solvent phase is continuous and the static interface is set at a point about one inch above the top of the bearing 19c. On starting the rotor the dynamic interface should be obtained as a layer of solvent ¼" below the bearing 19c. The position of the interfaces in each column will also depend on the flow rates of the feed solutions. Using a sample feed 3 to 5 normal with respect to nitric acid an organic solvent feed of 10% v./v. tributyl phosphate in odorless kerosene and a backwash feed of 0.4% v./v. solution of thioglycollic acid in 5% v./v. ammonium hydroxide flow rates of 6 ml./min. for the sample feed and 3 ml./min. for the organic and backwash feeds have been found satisfactory, concentrations of the order of 1 $\mu$g. of uranium per milliliter being detectable. The columns in this case had the following characteristics: Length of stirred section 9" internal diameter ½", rotor diameter ¼". The rotor speed was 2500 r.p.m. in the column 10 and 3000 r.p.m. in the column 11.

The feed rates of the solutions fed to columns 10 and 11 is controlled by the cam mechanism shown in FIG. 2, which operates plungers 41 in the dispensers 12, 13 and 15. Cams 42 are mounted on a cam shaft 43 running between bearings 44 and driven by a motor 45. The cams 42 depress the plungers 41 about 80 times a minute to allow liquid to flow into the feed pipes for the columns 10 and 11. The rate of feed will depend on the frequency at which the plungers 41 are depressed, and the extent and time they are depressed on each cycle. The frequency and time of depression is governed by the speed of rotation of the shaft 43 and the shape of the cams 42 and the extent that the plungers are depressed is adjusted by means of wedges 50 so that the feed rates for the different solutions may be varied individually. The size of the capillary delivery tubes from the dispensers is as large as possible subject to the requirement that they even out the liquid flow past the plungers 41.

The motor 45 is energized from supply terminals 51 via a manually controlled switch 46 and a switch 48 operated by a cam 47 on the cam shaft 43. The switches 46 and 48 are in parallel. The cam switch 48 is arranged to be closed (i.e. the motor energized) so long as any of the plungers 41 are depressed so that the motor cannot be stopped in a position which will allow flow of liquid past a depressed plunger.

The absorptiometer shown in FIG. 3 comprises two 1 cm. cells 31, 32 fitted respectively with inlet tubes 33, 34 and outlet tubes 35, 36. At the top of each cell is a spreader plate 52 to prevent streaming of liquid entering the cells and a priming cap 40. Colored ammonium thioglycollate solution is fed from the column 11 to the cell 31 via the tube 33 and leaves by the tube 35 and siphon head 37 to fall into a carbon dioxide lift 38 which transfers the solution to the inlet tube 34 of the cell 32. During the lifting operation uranium forms a colorless complex carbonate and any uranium thioglycollate complex present is destroyed so that the liquid reaching the cell 32 is a true blank solution with respect to uranium. In order to avoid spillage in the absorptiometer unit vent tubes 39 are provided. In the event of line blockage liquid builds up in the vent tubes 39 and can only overflow at a point outside the absorptiometer.

It is not essential that the aqueous solution from the column 11 should pass first through one cell of the absorptiometer and then through the other. It is possible to divert the flow of colored solution so that part flows through one cell and part is decolorized before flowing through the other cell but in that case the relative volumes of the two parts must be carefully controlled. It is also possible to arrange for the solution from more than one extraction system to be fed into the same absorptiometer, solution being allowed to flow into the absorptiometer cells from each extraction system in turn.

A suitable unit for measuring and recording the difference in color intensity between liquid in the two cells of the absorptiometer is described in British Patent No. 793,806.

We claim:
1. A process for measuring the uranium content of an organic solvent having uranium and other impurities present therein comprising washing the solvent with a solution of a salt of thioglycollic acid to produce a colored complex of uranium thioglycollate and other impurities in said solvent, treating at least a portion of said treated solvent with a material capable of imparting carbonate ions therein to convert only the uranium thioglycollate complex into a colorless state, measuring the difference between color intensity before and after treatment with said carbonate ion imparting agent by said color differentiation, and determining the amount of uranium present in said solvent by said color differentiation.

2. A process in accordance with claim 1, wherein the salt of thioglycollic acid is ammonium thioglycollate.

3. A process in accordance with claim 1, wherein the material capable of imparting carbonate ions is carbon dioxide.

4. A process in accordance with claim 1, wherein the material capable of imparting the carbonate ions is ammonium carbonate.

5. A process in accordance with claim 1, wherein the organic solvent is tributyl phosphate.

6. A process for measuring the uranium content of an organic solvent having uranium and other impurities present therein comprising washing the solvent with a solution of a salt of thioglycollic acid to produce a colored complex of uranium thioglycollate and other impurities in said solvent, measuring the color intensity of said solvent, treating said treated solvent with a material capable of imparting carbonate ions therein to convert only the uranium thioglycollate complex into a colorless state, measuring the color intensity of said solvent, determining the difference between the color intensity of the first stage and the second stage, and determining the amount of uranium present in said solvent by said color differentiation.

7. A process for measuring the uranium content of an aqueous uranium bearing solution having other impurities therein comprising treating the aqueous solution with tributyl phosphate to extract the uranium and other impurities in the tributyl phosphate phase, washing the tributyl phosphate phase containing uranium with ammonium thioglycollate to produce a colored complex or uranium thioglycollate and other impurities in said tributyl phosphate phase, treating at least a portion of said tributyl phosphate phase with carbon dioxide to convert only the uranium thioglycollate complex into a colorless phase, measuring the difference between the color intensity before and after the treatment with said carbon dioxide by said color differentiation, and determining the amount of uranium present in said solvent by said color differentiation.

References Cited in the file of this patent

UNITED STATES PATENTS 2,019,871     Pettingill ---------------- Nov. 5, 1935

OTHER REFERENCES

Manning: U.S.A.E.C., ORNL-1476, Jan. 13, 1953, Techn. Inf. Si., Oak Ridge, Tenn.

Davenport: Anal. Chem., vol. 21, September 1949, pp. 1093–1095.

Kienberger: Ibid., vol. 29, 1957, pp. 1721–22.

Rodden: Anal. Chem. of the Manhattan Project, 1950, p. 113.

Dizdar: Analyst, 1958, vol. 83, pp. 177–179.